US010257851B2

(12) United States Patent
Patel et al.

(10) Patent No.: US 10,257,851 B2
(45) Date of Patent: Apr. 9, 2019

(54) CHANNEL CONFIGURATION FOR CO-EXISTENCE ON A SHARED COMMUNICATION MEDIUM

(71) Applicant: QUALCOMM Incorporated, San Diego, CA (US)

(72) Inventors: Chirag Sureshbhai Patel, San Diego, CA (US); Tao Luo, San Diego, CA (US); Tamer Adel Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 16 days.

(21) Appl. No.: 15/272,125

(22) Filed: Sep. 21, 2016

(65) Prior Publication Data

US 2017/0094680 A1    Mar. 30, 2017

Related U.S. Application Data

(60) Provisional application No. 62/222,867, filed on Sep. 24, 2015.

(51) Int. Cl.
*H04W 72/12*   (2009.01)
*H04W 72/04*   (2009.01)
(Continued)

(52) U.S. Cl.
CPC ... *H04W 72/1284* (2013.01); *H04W 72/0446* (2013.01); *H04W 72/1289* (2013.01); *H04W 72/14* (2013.01); *H04W 76/27* (2018.02); *H04W 72/1215* (2013.01); *H04W 74/0808* (2013.01)

(58) Field of Classification Search
CPC ............. H04W 72/1284; H04W 72/14; H04W 76/046; H04W 72/0446; H04W 72/1289; H04W 74/0808; H04W 72/1215
See application file for complete search history.

(56) References Cited

U.S. PATENT DOCUMENTS

2007/0082620 A1* 4/2007 Zhang ................. H04W 52/24
                                                              455/69
2010/0029282 A1* 2/2010 Stamoulis ............. H04W 16/10
                                                              455/436
(Continued)

OTHER PUBLICATIONS

Alcatel-Lucent Shanghai Bell et al., "UL LBT and DL/UL Frame Structure for LAA," 3GPP Draft; RI-154574 UL LBT—Final, 3rd Generation Partnership Project (3GPP), Mobile Competence Centre ; 650, Route Des Lucioles ; F-06921 Sophia-Antipolis Cedex ; France, vol. RAN WGI, No. Beijing, China; Aug. 25, 2015-Aug. 28, 2015 Aug. 23, 2015 (Aug. 23, 2015), XP051039505, Retrieved from the Internet: URL:http://www.3gpp.org/ftp/Meetings 3GPP_SYNC/RAN1/Docs/ - - [retrieved on Aug. 23, 2015].

(Continued)

*Primary Examiner* — Mohammad S Anwar
(74) *Attorney, Agent, or Firm* — Muncy, Geissler, Olds & Lowe, P.C. Qualcomm Incorporated

(57) ABSTRACT

Techniques for channel configuration on a shared communication medium are disclosed. An access point may select a set of resource elements to carry an uplink control channel and transmit a configuration message including one or more configuration parameters associated with the selected set of resource elements to one or more access terminals. The access point may then receive uplink control signaling from the one or more access terminals via the selected set of resource elements. An access terminal may receive a configuration message including one or more configuration parameters for an uplink control channel from an access point and determine a set of resource elements configured to carry the uplink control channel based on the configuration message. The access terminal may then transmit uplink control signaling to the access point via the determined set of resource elements.

56 Claims, 11 Drawing Sheets

(51) Int. Cl.
  *H04W 72/14* (2009.01)
  *H04W 76/27* (2018.01)
  *H04W 74/08* (2009.01)

(56) References Cited

U.S. PATENT DOCUMENTS

| | | | | |
|---|---|---|---|---|
| 2011/0033051 | A1* | 2/2011 | Steer | H04L 5/0007 |
| | | | | 380/270 |
| 2012/0002568 | A1* | 1/2012 | Tiirola | H04L 1/0026 |
| | | | | 370/252 |
| 2012/0275411 | A1* | 11/2012 | Kim | H04L 5/0032 |
| | | | | 370/329 |
| 2015/0085797 | A1 | 3/2015 | Ji et al. | |

OTHER PUBLICATIONS

Ericsson, "On UCI Design for LAA", 3GPP Draft; R1-151134, 3rd Generation Partnership Project (3GPP). Mobile Competence Centre ; 650, Route Des Lucioles ; F-06921 Sophia-Antipolis Cedex; France vol. RAN WG1. No. Paris. France; Mar. 24, 2015-Mar. 26, 2015, Mar. 18, 2015 (Mar. 18, 2015), XP050951459. Retrieved from the Internet: URL: http://www.3gpp.org/ftp/tsg_ran/WG1_RL1/TSGR1_AH/LTE_LAA_1503/Docs/ [retrieved on Mar. 18, 2015].

International Search Report and Written Opinion—PCT/US2016/053218—ISA/EPO—dated Jan. 10, 2017.

LG Electronics: "Details on DCI Contents for MTC," 3GPP Draft; R1-154234 Details on DCI Contents for MTC, 3rd Generation Partnership Project (3GPP), Mobile Competence Centre ; 650 , Route Des Lucioles : F-06921 Sophia-Antipolis Cedex ; France vol. RAN WG1, No. Beijing, China; Aug. 24, 2015-Aug. 28, 2015 Aug. 23, 2015 (Aug. 23, 2015), XP051001570 Retrieved from the Internet: URL:http://www.3gpp.org/ftp/Meetings_3GPP_SYNC/RAN1/Docs/ [retrieved on Aug. 23, 2015] Chapter 2.1 "DL grant", "TPC for PUCCH".

* cited by examiner

CHANNEL CONFIGURATION FOR CO-EXISTENCE ON A SHARED COMMUNICATION MEDIUM

CROSS-REFERENCE TO RELATED APPLICATIONS

The present application claims the benefit of U.S. Provisional Application No. 62/222,867, entitled "Channel Configuration in a Shared Communication Medium," filed Sep. 24, 2015, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof In one example, a communication method is disclosed. The method may include, for example, selecting a set of resource elements to carry an uplink control channel; transmitting a configuration message including one or more configuration parameters associated with the selected set of resource elements to one or more access terminals; and receiving uplink control signaling from the one or more access terminals via the selected set of resource elements.

In another example, a communication apparatus is disclosed. The apparatus may include, for example, at least one processor, at least one memory coupled to the at least one processor, and at least one transceiver. The at least one processor and the at least one memory may be configured to select a set of resource elements to carry an uplink control channel. The at least one transceiver may be configured to transmit a configuration message including one or more configuration parameters associated with the selected set of resource elements to one or more access terminals, and to receive uplink control signaling from the one or more access terminals via the selected set of resource elements In another example, another communication apparatus is disclosed. The apparatus may include, for example, means for selecting a set of resource elements to carry an uplink control channel; means for transmitting a configuration message including one or more configuration parameters associated with the selected set of resource elements to one or more access terminals; and means for receiving uplink control signaling from the one or more access terminals via the selected set of resource elements.

In another example, a transitory or non-transitory computer-readable medium is disclosed, which, when executed by at least one processor, causes the at least one processor to perform operations for communication. The computer-readable medium may include, for example, code for selecting a set of resource elements to carry an uplink control channel; code for transmitting a configuration message including one or more configuration parameters associated with the selected set of resource elements to one or more access terminals; and code for receiving uplink control signaling from the one or more access terminals via the selected set of resource elements.

In another example, another communication method is disclosed. The method may include, for example, receiving a configuration message including one or more configuration parameters for an uplink control channel from an access point; determining a set of resource elements configured to carry the uplink control channel based on the configuration message; and transmitting uplink control signaling to the access point via the determined set of resource elements.

In another example, another communication apparatus is disclosed. The apparatus may include, for example, at least one processor, at least one memory coupled to the at least one processor, and at least one transceiver. The at least one transceiver may be configured to receive a configuration message including one or more configuration parameters for an uplink control channel from an access point. The at least one processor and the at least one memory may be configured to determine a set of resource elements configured to carry the uplink control channel based on the configuration message, wherein the at least one transceiver is further configured to transmit uplink control signaling to the access point via the determined set of resource elements.

In another example, another communication apparatus is disclosed. The apparatus may include, for example, means for receiving a configuration message including one or more configuration parameters for an uplink control channel from an access point; means for determining a set of resource elements configured to carry the uplink control channel based on the configuration message; and means for transmitting uplink control signaling to the access point via the determined set of resource elements.

In another example, another transitory or non-transitory computer-readable medium is disclosed, which, when executed by at least one processor, causes the at least one processor to perform operations for communication. The computer-readable medium may include, for example, code for receiving a configuration message including one or more configuration parameters for an uplink control channel from an access point; code for determining a set of resource elements configured to carry the uplink control channel based on the configuration message; and code for transmitting uplink control signaling to the access point via the determined set of resource elements.

BRIEF DESCRIPTION OF THE DRAWINGS

The accompanying drawings are presented to aid in the description of various aspects of the disclosure and are provided solely for illustration of the aspects and not limitation thereof

DETAILED DESCRIPTION

Figure 1:
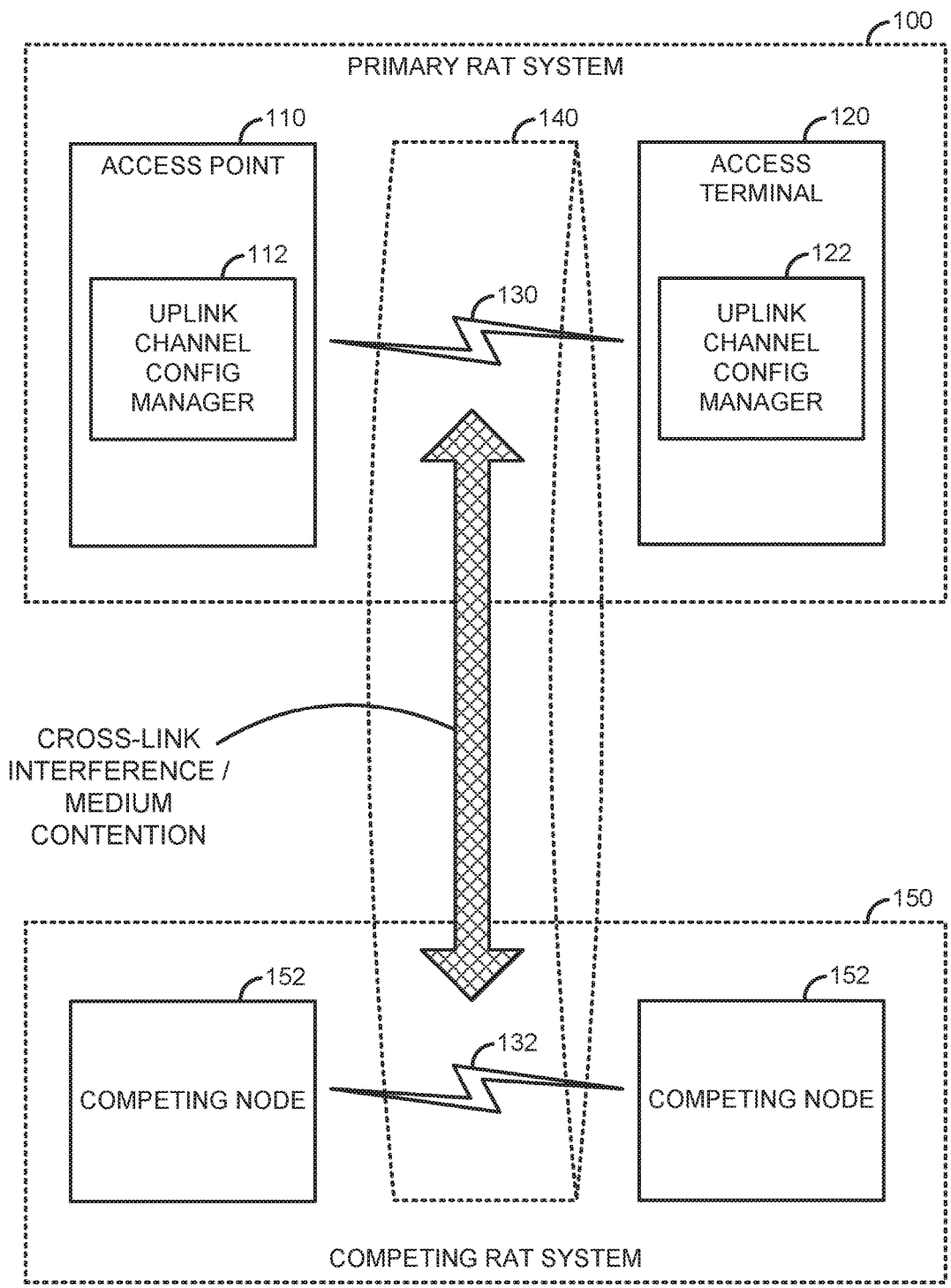
FIG. 1 is a system-level diagram illustrating an example wireless network environment.

The present disclosure relates generally to operation on a shared communication medium. To provide flexibility in light of the potential for interference and uncertain access to such a communication medium, uplink control channels such as a Physical Uplink Control Channel (PUCCH) may be dynamically configured with respect to their resource allocation. The resources selected by an access point for an uplink control channel at any given time may be coordinated with any access terminals being served by the access point via a configuration message or the like. The configuration message may be sent in a variety of ways, including both broadcast/multicast and unicast signaling, and may include subframe identifiers, symbol period identifiers, subcarrier identifiers, and so on.

Additional enhancements are also provided for multiplexing an uplink control channel such as the PUCCH with an uplink data channel such as a Physical Uplink Shared Channel (PUSCH). For example, a grant message allocating resources for the uplink data channel to an access terminal may further identify the timing of the uplink data channel with respect to the dynamic configuration of the uplink control channel (e.g., different start times of the PUSCH in different subcarrier interlaces, which may be variously occupied by the PUCCH). As another example, an access terminal may be configured to transmit certain signaling (e.g., a dummy signal) in a given symbol period even if the access terminal is not designated for control signaling in that symbol period, which may help to maintain contiguous operation on the communication medium and avoid being blocked with respect to later-scheduled uplink data signaling. As another example, the transmission power of the uplink control channel may be coupled to that of the uplink data channel (e.g., to match or substantially match coverage areas).

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (TOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the dynamic channel configuration techniques discussed briefly above. For example, the access point 110 may include an uplink channel configuration manager 112 and the access terminal 120 may include an uplink channel configuration manager 122. The uplink channel configuration manager 112 and/or the uplink channel configuration manager 122 may be configured in different ways to manage the configuration of different uplink channels on the communication medium 140.

Figure 2:
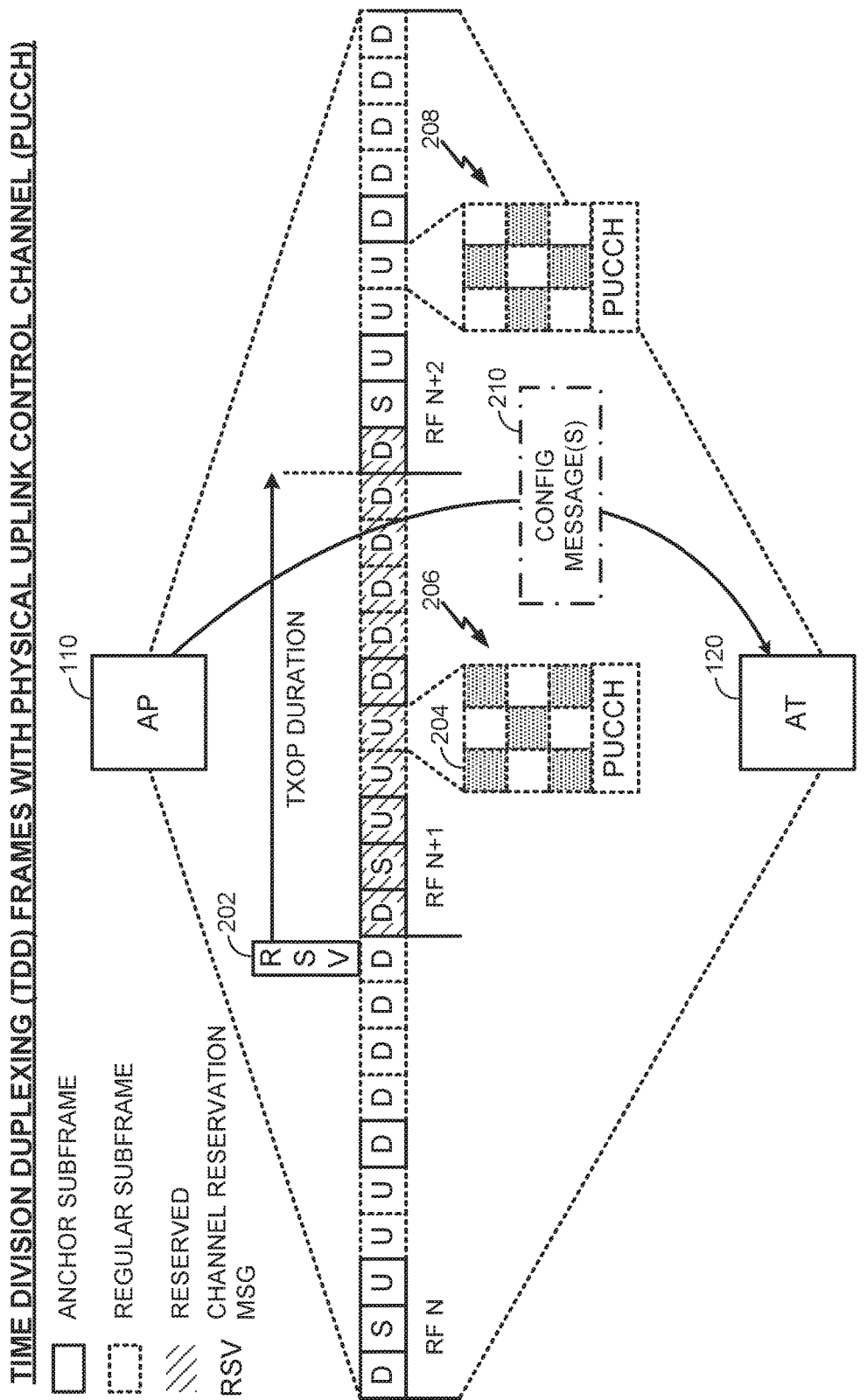
FIG. 2 illustrates an example virtual Time Division Duplexing (TDD) frame structure with an uplink control channel shown by way of example as a Physical Uplink Control Channel (PUCCH).

FIG. 2 illustrates an example virtual Time Division Duplexing (TDD) frame structure that may be implemented for the primary RAT system 100 on the communication medium 140 to facilitate contention-based access between the access point 110/access terminal 120 and the competing RAT system 150.

The illustrated frame structure includes a series of radio frames (RFs) that are numbered in accordance with a system frame number numerology (RF N, N+1, N+2, etc.) and divided into respective subframes (SFs), which may also be numbered for reference (e.g., SF0, SF1, etc.). Each respective subframe may be further divided into slots (not shown in FIG. 2), and the slots may be further divided into symbol periods. As an example, the LTE frame structure includes system frames that are divided into 1024 numbered radio frames composed of 10 subframes each, which together constitute a system frame cycle (e.g., lasting 10.24s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

The example frame structure of FIG. 2 is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 2, a TDD configuration is employed that is similar to TDD Config 3 in LTE. The particular TDD configuration employed may be broadcast by the access point 110 using a System Information Block (SIB) message, a new physical channel to indicate the TDD frame format in the control region, or the like (e.g., a SIB-1 message in LTE).

Although each TDD configuration is different, there may be one or more subframes that are the same across all TDD configurations. These subframes are referred to herein as anchor subframes. Returning again to the LTE example above, the subframe SF0 is a downlink subframe, SF1 is a special subframe, SF2 is an uplink subframe, and SF5 is a downlink subframe in each radio frame across each of the TDD configurations TDD Config 0 through TDD Config 6. In the illustrated example, the anchor subframes similarly correspond to the subframes SF0, SF1, SF2, and SF5 of each radio frame, although it will be appreciated that the specific anchor carrier designations may vary across different systems.

The example frame structure of FIG. 2 is virtual in that each subframe may or may not be occupied by primary RAT signaling in any given instance due to the contention procedure for accessing the communication medium 140. In general, if the access point 110 or the access terminal 120 fails to win contention for a given subframe that subframe may be silenced.

At some point during the contention process, the communication medium 140 becomes clear (e.g., CCA Clear) and the access point 110, for example, seizes it. In order to reserve the communication medium 140 for itself for a Transmission Opportunity (TXOP) having a certain duration (e.g., one radio frame), the access point 110 may send a channel reservation message (RSV) 202 defined for the competing RAT system 150. The channel reservation message 202 may be transmitted over the communication medium 140 (e.g., via a competing-RAT-specific transceiver also belonging to the access point 110) to reserve the communication medium 140 for primary RAT operation. Example channel reservation messages may include, for example, 802.11a Data packets, Clear-to-Send-to-Self (CTS2S) messages, Request-to-Send (RTS) messages, Clear-to-Send (CTS) messages, Physical Layer Convergence Protocol (PLCP) headers (e.g., a legacy signal (L-SIG), a high throughput signal (HT-SIG), or very high throughput signal (VHT-SIG)), and the like for a competing Wi-Fi RAT, or other similar messages defined for other competing RATs of interest. The channel reservation message 202 may include a duration indication (e.g., a Network Allocation Vector (NAV)) corresponding to the duration of the target TXOP for which the access point 110 contended for access.

To help facilitate uplink operation on the communication medium 140, the access point 110 may dynamically rather than statically configure an uplink control channel, shown in FIG. 2 and described by way of example below as a Physical Uplink Control Channel (PUCCH). This may provide flexibility in response to potential interference or channel blocking scenarios created by the competing RAT system 150.

As is further shown in FIG. 2, each uplink subframe may include a number of resource elements 204 corresponding to different combinations of time (e.g., a given symbol period) and frequency (e.g., a given subcarrier) resources on the communication medium 140. The access point 110 may dynamically select the set of resources to carry the PUCCH. In the illustrated example, the access point 110 may configure a first instance of PUCCH with one set of resource elements (configuration 206) and configure a second instance of PUCCH with another set of resource elements (configuration 208).

To coordinate access terminal signaling with the PUCCH configuration, the access point 110 may send to the access terminal 120, for example, a configuration message 210 including one or more configuration parameters associated with the selected set of resource elements. The configuration message 210 may be sent periodically or on an event-driven basis. As an example, the configuration message 210 may be sent at the beginning of each radio frame in a given TXOP.

Figure 3:
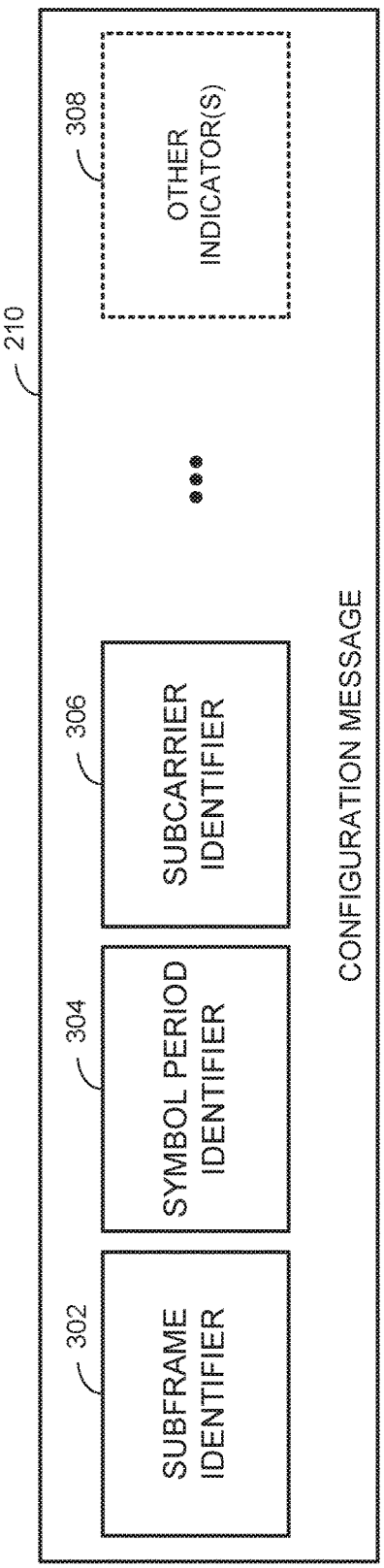
FIG. 3 illustrates an example implementation of a configuration message.

FIG. 3 illustrates an example implementation of the configuration message 210. In this example, the configuration message 210 includes, in relevant part, a subframe identifier 302, a symbol period identifier 304, a subcarrier identifier 306, and any other identifier(s) 308 as appropriate for a given implementation. It will be appreciated that the single configuration message 210 is shown for illustration purposes only, and that in different designs and scenarios the various identifiers may be transmitted (broadcasted or unicasted) in different sets of signals, as separate individual signals, and so on, or may be omitted entirely, as appropriate.

The subframe identifier 302 may be used to identify one or more uplink subframes in which the selected set of resource elements is located. For example, with reference again to FIG. 2, the subframe identifier 302 may identify the uplink subframe associated with the first configuration 206, the uplink subframe associated with the second configuration 208, or both. In general, the identified uplink subframe may be inside the TXOP in which the configuration message 210 is sent (e.g., the uplink subframe associated with the first configuration 206) or outside the TXOP in which the configuration message 210 is sent (e.g., the uplink subframe associated with the second configuration 208).

The symbol period identifier 304 may identify one or more symbol periods in which the selected set of resource elements is located. For example, the symbol period identifier 304 may identify a starting position and duration for the PUCCH within the uplink subframe identified by the subframe identifier 302. In some designs, only the starting position or the duration may be explicitly identified, with the other being implied or otherwise predetermined (e.g., based on an assigned PUCCH format). The number of symbol periods may be dynamically configured to allow flexible operation (e.g., spanning 2, 7, or 14 symbol periods to cover both short PUCCH and longer PUCCH formats for different size payloads). The symbol periods may also include both reference and payload symbol periods (e.g., for a PUCCH spanning 2 symbol periods, the first symbol period may be used for reference symbols and the second symbol period may carry the PUCCH payload).

The subcarrier identifier 306 may identify one or more subcarriers in which the selected set of resource elements is located. For example, the subcarrier identifier 306 may identify the specific frequency or frequencies carrying the PUCCH within the symbol periods identified by the symbol period identifier 304. As another example, the subcarrier identifier 306 may identify an interlace of frequencies across a channel bandwidth carrying the PUCCH within the symbol periods identified by the symbol period identifier 304.

The configuration message 210 may be sent in a variety of ways, including both unicast signaling directed to individual access terminals and broadcast/multicast signaling common to a group of access terminals. For example, the configuration message 210 may be sent to each access terminal separately as individual Radio Resource Control (RRC) messages. As another example, the configuration message 210 may be sent to each access terminal collectively as a common Downlink Control Information (DCI) message. A new DCI format may be defined that indicates which access terminals are designated for transmission on the PUCCH along with its configuration. The DCI format can be used to convey information for one or more access terminals in a common message.

Figure 4:
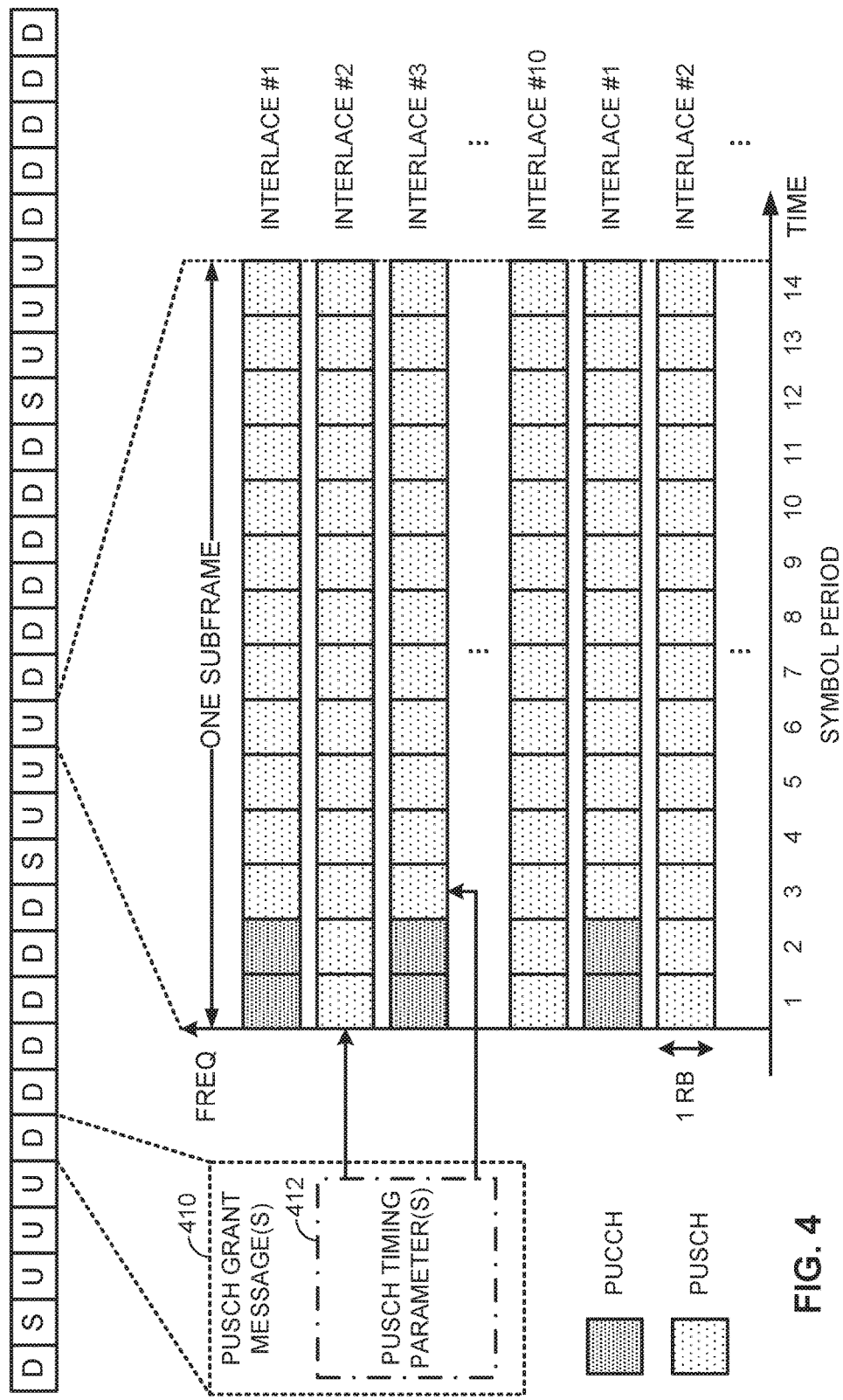
FIG. 4 is a resource map illustrating, in relevant part, an example subframe structure for multiplexing an uplink control channel such as the PUCCH with an uplink data channel shown by way of example as a Physical Uplink Shared Channel (PUSCH).

FIG. 4 is a resource map illustrating, in relevant part, an example subframe structure for multiplexing an uplink control channel such as the PUCCH with an uplink data channel shown by way of example as a Physical Uplink Shared Channel (PUSCH). In general, the PUSCH may span all or a portion of the symbol periods making up the subframe (e.g., 14 symbol periods for a normal cyclic prefix) in the time domain and one or more subcarrier interlaces formed from a set of subcarriers in the frequency domain.

In the illustrated example, the resource elements making up the subframe are grouped into various Resource Blocks (RBs) and separated into ten interlaces (shown as Interlaces #1-#10), with the PUCCH and PUSCH occupying respective subsets of the RBs and interlaces. As an example of an interlacing structure, for a 20 MHz channel bandwidth with 100 RBs, a set of 10 RBs consisting of every 10th RB may be dedicated to each interlace. Other channels such as a Physical Random Access Channel (PRACH), a Sounding Reference Signal (SRS) channel, etc. (not shown), may occupy other RBs and interlaces.

The access point 110 may allocate a subset of the resource elements for the PUSCH to the access terminal 120 via a grant message 410 or the like in a preceding subframe. As shown, however, the PUSCH may start in different symbol periods depending on whether a corresponding interlace is shared by the dynamically allocated PUCCH (or some other channel). In the illustrated example, the PUSCH may start at the third symbol period in Interlace #1, where the PUCCH occupies the first and second symbol periods, but at the first symbol period in Interlace #2, which does not contain the PUCCH.

To assist the access terminal 120 in identifying the location of the PUSCH in any given interlace, the grant message 410 may further include one or more PUSCH timing parameters 412 that identify a start time (e.g., symbol period) within the subframe for the set of resource elements carrying the PUSCH. Returning to the example above, the timing parameters 412 may identify the third symbol period in Interlace #1 as the start time for the PUSCH in that interlace, the first symbol period in Interlace #2 as the start time for the PUSCH in that interlace, and so on. Based on this information, the access terminal 120 may also perform rate matching accordingly.

Figure 5:
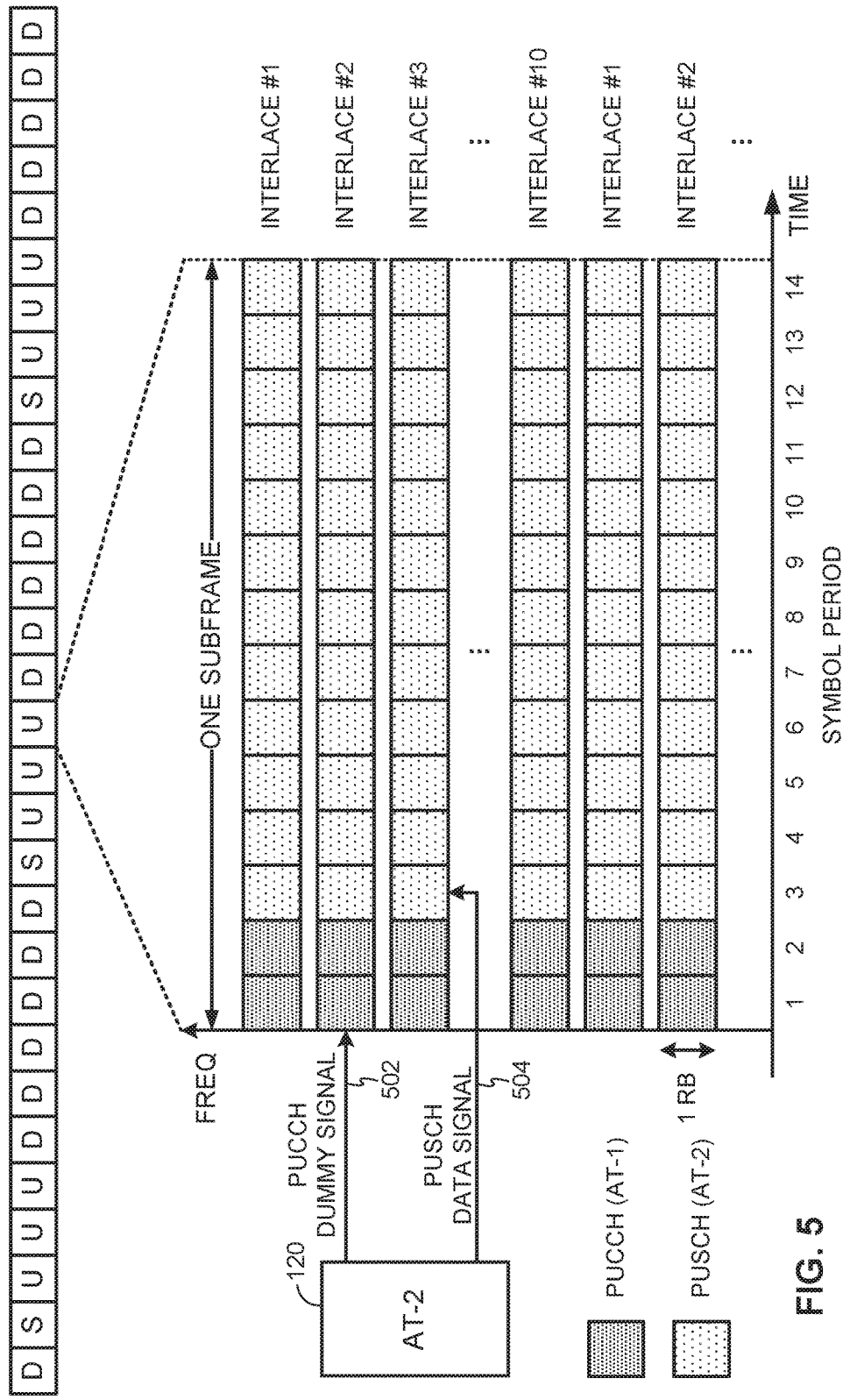
FIG. 5 is a resource map illustrating, in relevant part, another example subframe structure for multiplexing an uplink control channel such as the PUCCH with an uplink data channel such as the PUSCH.

FIG. 5 is a resource map illustrating, in relevant part, another example subframe structure for multiplexing an uplink control channel such as the PUCCH with an uplink data channel such as the PUSCH. In this example, the first two symbol periods of each interlace are configured for the PUCCH and allocated to a first access terminal (AT-1) while the remaining symbol periods of each interlace are configured for the PUSCH and allocated, at least in part, to a second access terminal (AT-2) shown by way of example as the access terminal 120. This scenario may arise, for example, in certain systems where access terminals are restricted from transmitting on both the PUCCH and PUSCH in the same subframe.

As shown, despite the separate allocation and potential subframe restrictions, the access terminal 120 may send signaling via the PUCCH during the first two symbol periods. In some deployments, the contention requirements for the communication medium 140 may require contiguous occupation in order to avoid having to re-contend for access. By sending signaling via the PUCCH during the first two symbol periods, the access terminal 120 may maintain any required transmission continuity leading up to the PUSCH and avoid having to re-contend for access to the communication medium 140. Re-contention may be difficult due to the other access terminal (AT-1) occupying the medium 140 just prior to the PUSCH.

A dummy signal 502 or the like may be used by the access terminal 120 during the first two symbol periods. As an example, the dummy signal 502 may have a signature associated with the access terminal 120 and known to the access point 110 to distinguish the dummy signal 502 from PUCCH signaling by the other access terminal (AT-1). The signature can be in the form of a spreading sequence used for a reference signal sent as part of the dummy signal. As another example, the dummy signal 502 may occupy one or more predetermined interlaces reserved for dummy signaling to again distinguish the dummy signal 502 from PUCCH signaling by the other access terminal (AT-1). The actual PUSCH data signal 504 may be transmitted by the access terminal 120 in the next designated symbol period.

Figure 6:
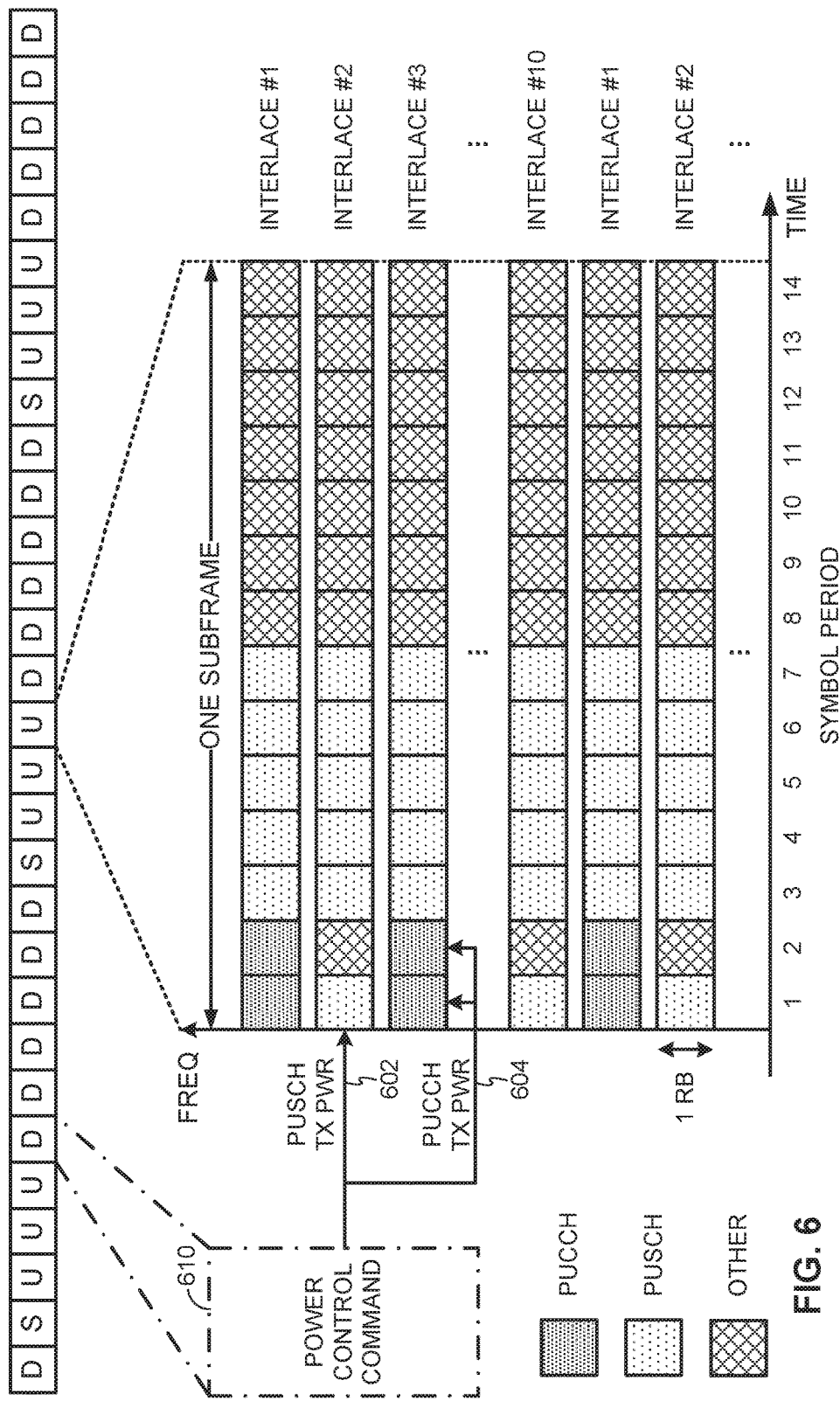
FIG. 6 is a resource map illustrating, in relevant part, a power control scheme for multiplexing an uplink control channel such as the PUCCH with an uplink data channel such as the PUSCH.

FIG. 6 is a resource map illustrating, in relevant part, a power control scheme for multiplexing an uplink control channel such as the PUCCH with an uplink data channel such as the PUSCH. In this example, the first two symbol periods of some interlaces (e.g., the odd-numbered Interlaces #1, #3, etc.) are configured to carry the PUCCH while the other symbol periods and other interlaces are configured to carry the PUSCH or other channels as shown. In the first symbol period of the illustrated subframe, the PUCCH and the PUSCH are multiplexed across the subcarrier interlaces. In the second symbol period of the illustrated subframe, the PUCCH and the PUSCH are not multiplexed.

As shown, the access point 110 may set a transmission power for the two channels and transmit a corresponding power control command 610 to the access terminal 120, as well as any other access terminals being served, such as in a preceding downlink subframe prior to the uplink subframe carrying the PUCCH and the PUSCH. The power control command 610 may indicate, either directly or indirectly, a transmission power for one or both of the PUCCH and the PUSCH, with a separate PUSCH transmission power 602 and PUCCH transmission power 604 being shown for illustration purposes. As an example, the power control command 610 may include a set-point for one or both of the channels, an offset between the channels, and so on.

As is further shown, the PUCCH transmission power may be set based on, rather than independent from, the PUSCH transmission power. For example, although the PUCCH generally requires lower transmission power, it may be beneficial to boost the transmission power to match or substantially match the PUSCH transmission power. A more uniform transmission power across the two channels may create a more uniform interference pattern that is easier to mitigate and may also allow for a more straightforward implementation at both the access point 110 and the access terminal 120. Even when the PUCCH and the PUSCH are not transmitted in the same symbol period, as in the second symbol period of the illustrated example where the PUCCH is transmitted without the PUSCH, boosting the PUCCH transmission power may allow the communication medium 140 to remain occupied by the primary RAT system 100 over the full coverage area of the access point 110, and therefore prevent the competing RAT system 150 from seizing a portion of the communication medium 140.

In general, the PUCCH and PUSCH may be transmitted with a constant power across all symbol periods and subcarriers. The transmission powers may also be chosen to maximize the coverage area of each channel, at least within a total power constraint, again to preserve access to the communication medium 140 by the primary RAT system 100. It will also be appreciated that although the PUCCH and PUSCH are described here for illustration purposes, power control for other channels may be performed in a similar manner to match or substantially match their coverage areas, including other control channels such as a Sounding Reference Signal (SRS) channel, a Channel State Information Reference Signal (CSI-RS) channel, etc.

Figure 7:
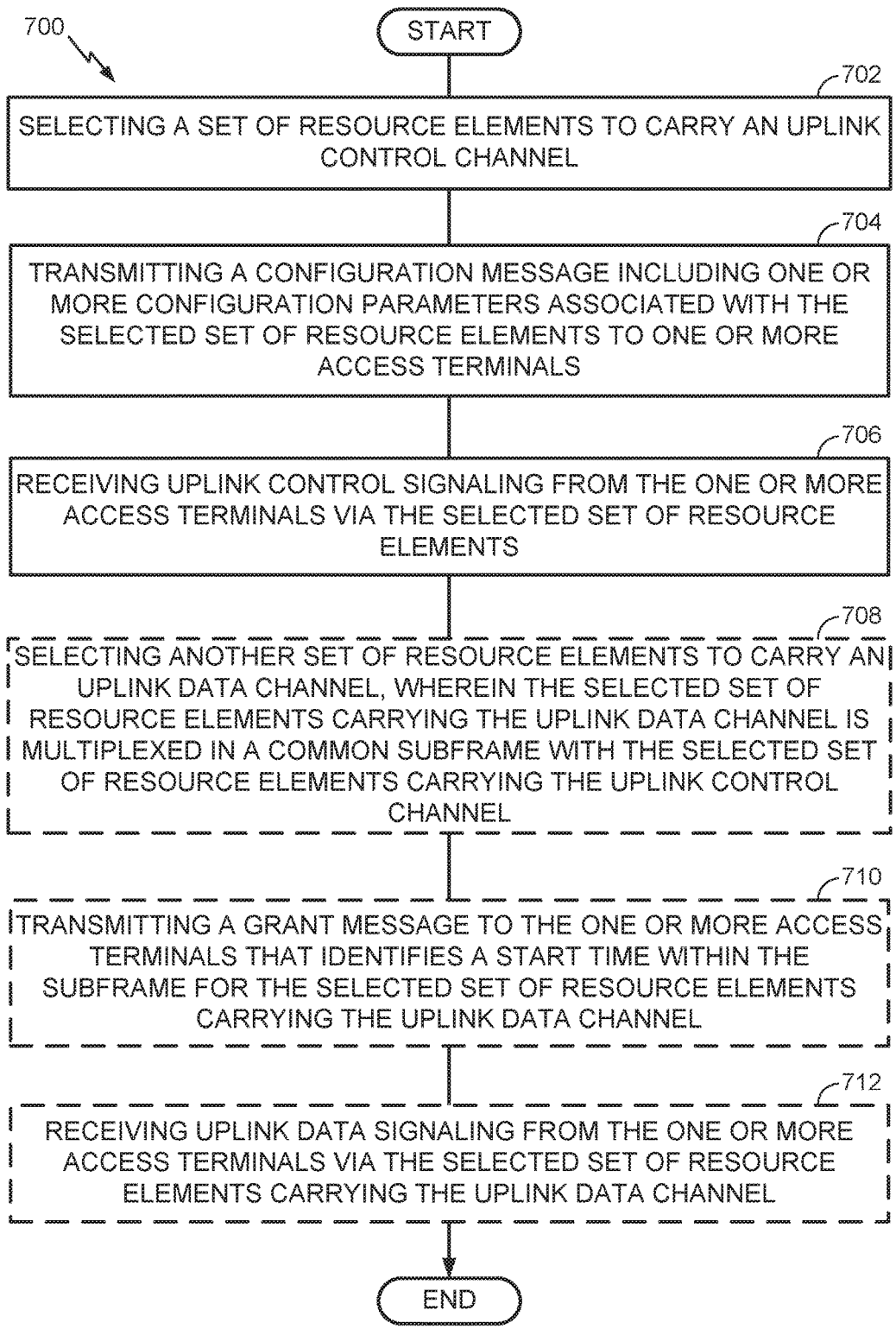
FIG. 7 is a flow diagram illustrating an example method of communication in accordance with the techniques described herein.

FIG. 7 is a flow diagram illustrating an example method of communication in accordance with the techniques described above. The method 700 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may select a set of resource elements to carry an uplink control channel (block 702) and transmit a configuration message including one or more configuration parameters associated with the selected set of resource elements to one or more access terminals (block 704). The access point may then receive uplink control signaling from the one or more access terminals via the selected set of resource elements (block 706).

As discussed in more detail above, the access point may also dynamically change the configuration of the uplink control channel. For example, the access point may select another set of resource elements to carry the uplink control channel, transmit another configuration message including one or more other configuration parameters associated with the other selected set of resource elements to the one or more access terminals, and receive uplink control signaling from the one or more access terminals via the other selected set of resource elements.

As an example, the one or more configuration parameters may include a subframe identifier identifying one or more uplink subframes in which the selected set of resource elements is located, a symbol period identifier identifying one or more symbol periods in which the selected set of resource elements is located, a subcarrier identifier identifying one or more subcarriers in which the selected set of resource elements is located, or a combination thereof The configuration message may be transmitted (block 704) in different ways. For example, the configuration message may be transmitted to each of the one or more access terminals separately as individual RRC message. As another example, the configuration message may be transmitted to each of the one or more access terminals collectively as a common DCI message.

In some designs or scenarios, the access point may also configure an uplink data channel. For example, the access point may select another set of resource elements to carry the uplink data channel, with the selected set of resource elements carrying the uplink data channel being multiplexed in a common subframe with the selected set of resource elements carrying the uplink control channel (optional block 708). The access point may then transmit a grant message to the one or more access terminals that identifies a start time within the subframe for the selected set of resource elements carrying the uplink data channel (optional block 710) and receive uplink data signaling from the one or more access terminals via the selected set of resource elements carrying the uplink data channel (optional block 712). The grant message may identify, for example, a first start time for a first subcarrier interlace of the selected set of resource elements carrying the uplink data channel and a second start time for a second subcarrier interlace of the selected set of resource elements carrying the uplink data channel.

In some designs or scenarios, the access point may receive uplink control signaling from an access terminal in a given symbol period even if the access terminal is not designated for control signaling in that symbol period. For example, the access point may allocate at least a portion of the selected set of resource elements carrying the uplink control channel to a first access terminal in a first symbol period and allocate at least a portion of the selected set of resource elements carrying the uplink data channel to a second access terminal in a second symbol period. The access point may then receive signaling from the second access terminal via the allocated portion of the selected set of resource elements carrying the uplink control channel during the first symbol period. As an example, the received signaling may comprise a dummy signal having a signature associated with the second access terminal or received over a subcarrier interlace reserved for dummy signaling.

In some designs or scenarios, the access point may couple the transmission power of the uplink control channel to that of the uplink data channel (e.g., to match or substantially match coverage areas). For example, the access point may set a first transmission power for the uplink data channel, set a second transmission power for the uplink control channel based on the first transmission power for the uplink data channel, and transmit a power control command to the one or more access terminals that indicates at least the second transmission power for the uplink control channel.

Figure 8:
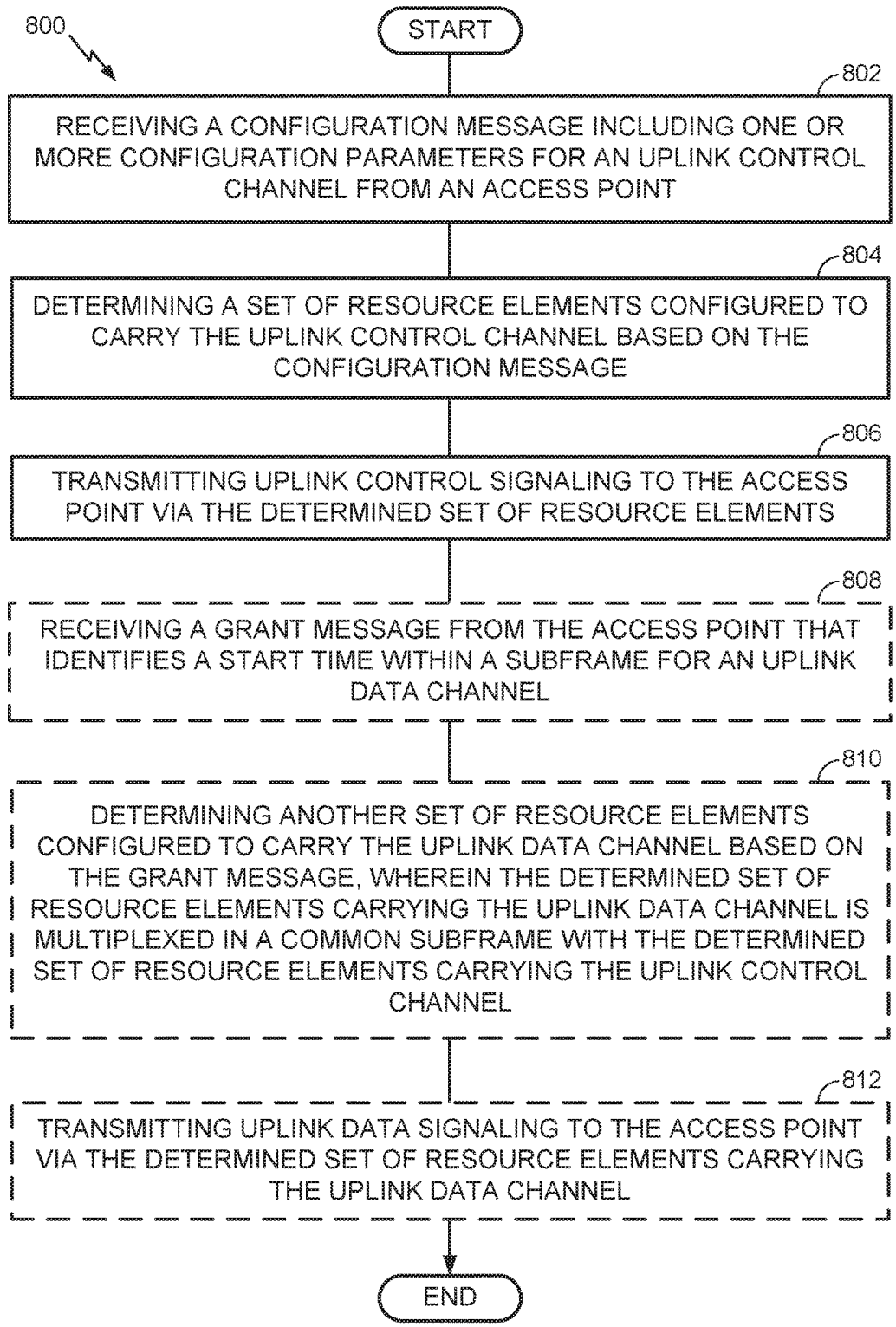
FIG. 8 is a flow diagram illustrating another example method of communication in accordance with the techniques described herein.

FIG. 8 is a flow diagram illustrating another example method of communication in accordance with the techniques described above. The method 800 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive a configuration message including one or more configuration parameters for an uplink control channel from an access point (block 802) and determine a set of resource elements configured to carry the uplink control channel based on the configuration message (block 804). The access terminal may then transmit uplink control signaling to the access point via the determined set of resource elements (block 806).

As discussed in more detail above, the access terminal may also dynamically determine that the configuration of the uplink control channel has changed. For example, the access terminal may receive another configuration message including one or more other configuration parameters for the uplink control channel from the access point, determine another set of resource elements configured to carry the uplink control channel based on the other configuration message, and transmit uplink control signaling to the access point via the other determined set of resource elements.

As an example, the one or more configuration parameters may include a subframe identifier identifying one or more uplink subframes in which the determined set of resource elements is located, a symbol period identifier identifying one or more symbol periods in which the determined set of resource elements is located, a subcarrier identifier identifying one or more subcarriers in which the determined set of resource elements is located, or a combination thereof The configuration message may be received (block 802) in different ways. For example, the configuration message may be received from the access point as an individual RRC message. As another example, the configuration message may be received from the access point as a common DCI message.

In some designs or scenarios, the access terminal may also determine the configuration of an uplink data channel. For example, the access terminal may receive a grant message from the access point that identifies a start time within a subframe for an uplink data channel (optional block 808) and determine another set of resource elements configured to carry the uplink data channel based on the grant message, with the determined set of resource elements carrying the uplink data channel being multiplexed in the subframe with the determined set of resource elements carrying the uplink control channel (optional block 810). The access terminal may then transmit uplink data signaling to the access point via the determined set of resource elements carrying the uplink data channel (optional block 812). The grant message may identify, for example, a first start time for a first subcarrier interlace of the determined set of resource elements carrying the uplink data channel and a second start time for a second subcarrier interlace of the determined set of resource elements carrying the uplink data channel.

In some designs or scenarios, the access terminal may transmit uplink control signaling in a given symbol period even if the access terminal is not designated for control signaling in that symbol period. For example, the access terminal may receive no allocation from the access point of any of the determined set of resource elements carrying the uplink control channel in a first symbol period but receive an allocation from the access point of at least a portion of the determined set of resource elements carrying the uplink data channel in a second symbol period. The access terminal may nevertheless transmit signaling to the access point via the allocated portion of the determined set of resource elements carrying the uplink control channel during the first symbol period. As an example, the transmitted signaling may comprise a dummy signal having a signature associated with an access terminal transmitting the signaling or transmitted over a subcarrier interlace reserved for dummy signaling.

In some designs or scenarios, the access terminal may couple the transmission power of the uplink control channel to that of the uplink data channel (e.g., to match or substantially match coverage areas). For example, the access terminal may receive a power control command from an access point, transmit uplink data signaling via the uplink data channel at a first transmission power based on the power control command, and transmitting uplink control signaling via the uplink control channel at a second transmission power based on the power control command and the first transmission power.

For generality, the access point 110 and the access terminal 120 are shown in FIG. 1 only in relevant part as including the uplink channel configuration manager 112 and the uplink channel configuration manager 122, respectively. It will be appreciated, however, that the access point 110 and the access terminal 120 may be configured in various ways to provide or otherwise support the dynamic channel configuration techniques discussed herein.

Figure 9:
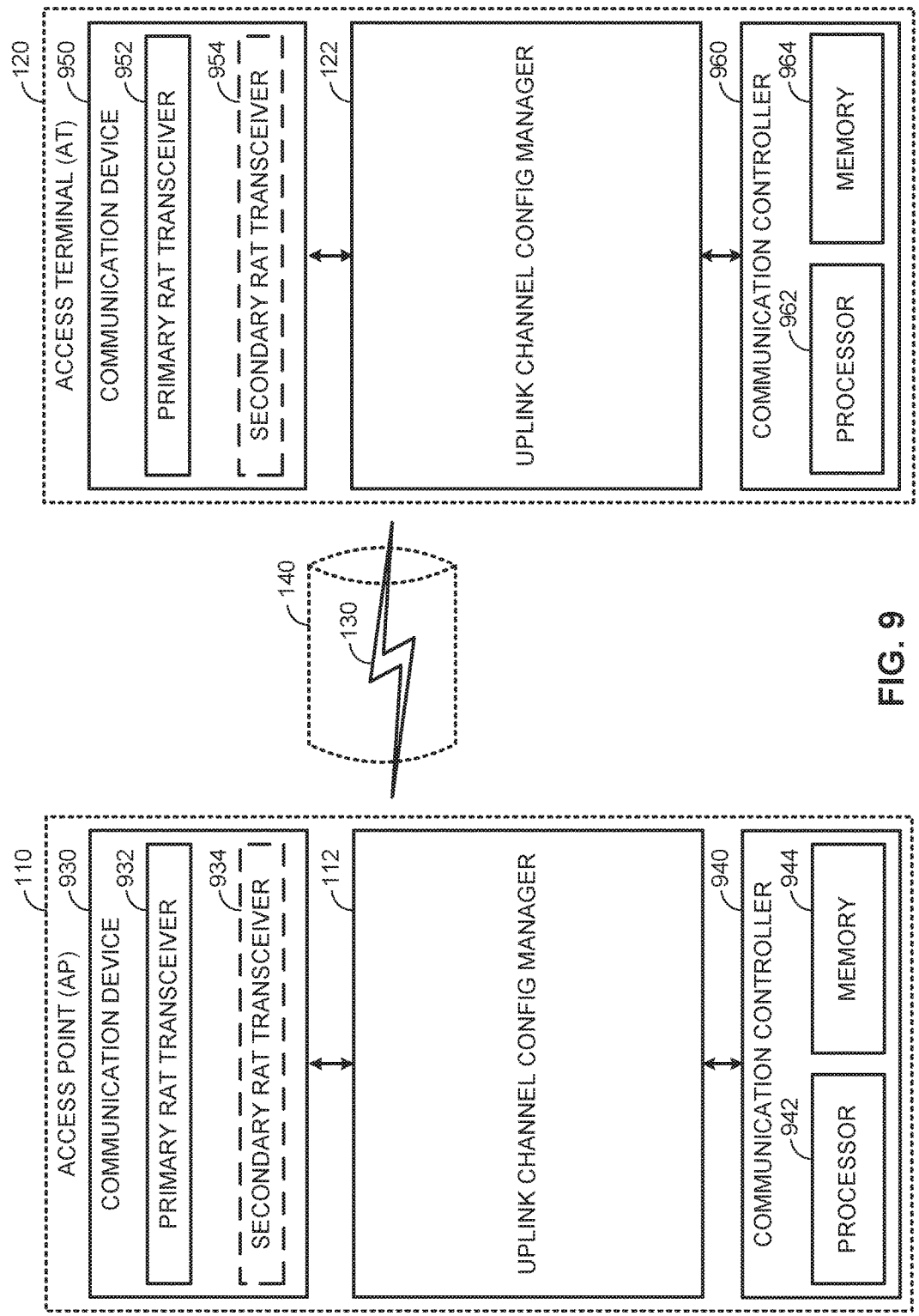
FIG. 9 is a device-level diagram illustrating example components of an access point and an access terminal in more detail.

FIG. 9 is a device-level diagram illustrating example components of the access point 110 and the access terminal 120 of the primary RAT system 100 in more detail. As shown, the access point 110 and the access terminal 120 may each generally include a wireless communication device (represented by the communication devices 930 and 950) for communicating with other wireless nodes via at least one designated RAT. The communication devices 930 and 950 may be variously configured for transmitting and encoding signals, and, conversely, for receiving and decoding signals in accordance with the designated RAT (e.g., messages, indications, information, pilots, and so on).

The communication devices 930 and 950 may include, for example, one or more transceivers, such as respective primary RAT transceivers 932 and 952, and, in some designs, (optional) co-located secondary RAT transceivers 934 and 954, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 940 and 960) for controlling operation of their respective communication devices 930 and 950 (e.g., directing, modifying, enabling, disabling, etc.). The communication controllers 940 and 960 may include one or more processors 942 and 962, and one or more memories 944 and 964 coupled to the processors 942 and 962, respectively. The memories 944 and 964 may be configured to store data, instructions, or a combination thereof, either as on-board cache memory, as separate components, a combination, etc. The processors 942 and 962 and the memories 944 and 964 may be standalone communication components or may be part of the respective host system functionality of the access point 110 and the access terminal 120.

It will be appreciated that the uplink channel configuration manager 112 and the uplink channel configuration manager 122 may be implemented in different ways. In some designs, some or all of the functionality associated therewith may be implemented by or otherwise at the direction of at least one processor (e.g., one or more of the processors 942 and/or one or more of the processors 962), at least one memory (e.g., one or more of the memories 944 and/or one or more of the memories 964), at least one transceiver (e.g., one or more of the transceivers 932 and 934 and/or one or more of the transceivers 952 and 954), or a combination thereof. In other designs, some or all of the functionality associated therewith may be implemented as a series of interrelated functional modules.

Accordingly, it will be appreciated that the components in FIG. 9 may be used to perform operations described above with respect to FIGS. 1-8. For example, the access point 110 may select, via the processor 942 and the memory 944, a set of resource elements to carry an uplink control channel. The access point 110 may transmit, via the primary RAT transceiver 932, a configuration message including one or more configuration parameters associated with the selected set of resource elements to the access terminal 120. The access point 110 may receive, via the primary RAT transceiver 932, uplink control signaling from the access terminal 120 via the selected set of resource elements. In addition, the access point 110 may select, via the processor 942 and the memory 944, another set of resource elements to carry the uplink data channel. The access point 110 may then transmit, via the primary RAT transceiver 932, a grant message to the access terminal 120 that identifies a start time within a subframe for the selected set of resource elements carrying the uplink data channel. The access point 110 may receive, via the primary RAT transceiver 932, uplink data signaling from the access terminal 120 via the selected set of resource elements carrying the uplink data channel.

As another example, the access terminal 120 may receive, via the processor 962 and the memory 964, a configuration message including one or more configuration parameters for an uplink control channel from the access point 110. The access terminal 120 may determine, via the processor 962 and the memory 964, a set of resource elements configured to carry the uplink control channel based on the configuration message. The access terminal 120 may then transmit, via the primary RAT transceiver 952, uplink control signaling to the access point 110 via the determined set of resource elements. In addition, the access terminal may receive, via the primary RAT transceiver 952, a grant message from the access point 110 that identifies a start time within a subframe for an uplink data channel. The access terminal 120 may determine, via the processor 962 and the memory 964, another set of resource elements configured to carry the uplink data channel based on the grant message. The access terminal 120 may then transmit, via the primary RAT transceiver 952, uplink data signaling to the access point 110 via the determined set of resource elements carrying the uplink data channel.

Figure 10:
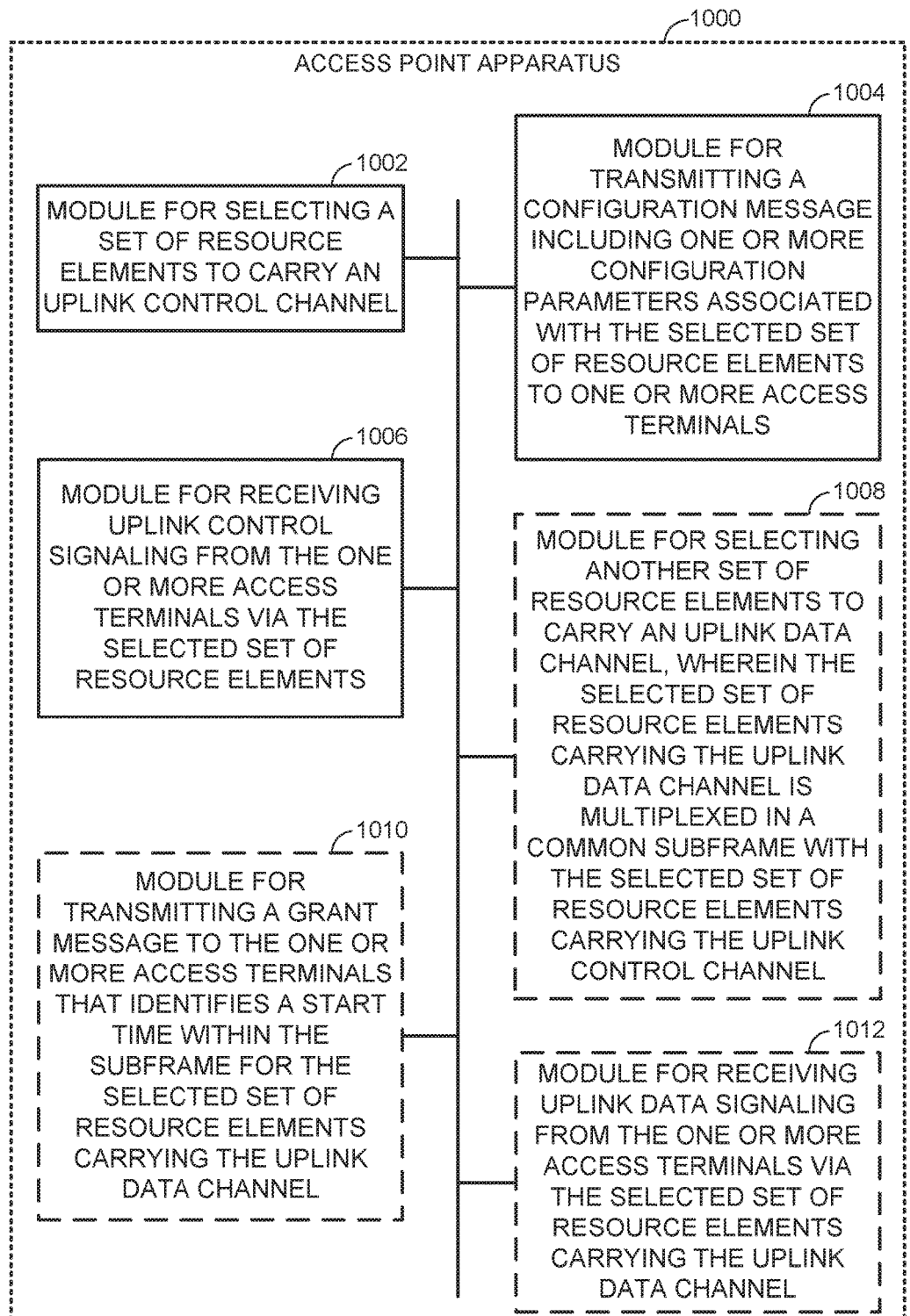
FIG. 10 illustrates an example apparatus represented as a series of interrelated functional modules.

FIG. 10 illustrates an example access point apparatus for implementing the uplink channel configuration manager 112 represented as a series of interrelated functional modules. In the illustrated example, the apparatus 1000 includes a module for selecting 1002, a module for transmitting 1004, a module for receiving 1006, an (optional) module for selecting 1008, an (optional) module for transmitting 1010, and an (optional module for receiving 1012.

The module for selecting 1002 may be configured to select a set of resource elements to carry an uplink control channel. The module for transmitting 1004 may be configured to transmit a configuration message including one or more configuration parameters associated with the selected set of resource elements to one or more access terminals. The module for receiving 1006 may be configured to receive uplink control signaling from the one or more access terminals via the selected set of resource elements.

As discussed in more detail above, the configuration of the uplink control channel may be dynamically changed and the configuration message may be transmitted in different ways. As an example, the one or more configuration parameters may include a subframe identifier identifying one or more uplink subframes in which the selected set of resource elements is located, a symbol period identifier identifying one or more symbol periods in which the selected set of resource elements is located, a subcarrier identifier identifying one or more subcarriers in which the selected set of resource elements is located, or a combination thereof.

Returning to FIG. 10, the (optional) module for selecting 1008 may be configured to select another set of resource elements to carry the uplink data channel, with the selected set of resource elements carrying the uplink data channel being multiplexed in a common subframe with the selected set of resource elements carrying the uplink control channel. The (optional) module for transmitting 1010 may be configured to transmit a grant message to the one or more access terminals that identifies a start time within the subframe for the selected set of resource elements carrying the uplink data channel. The (optional) module for receiving 1012 may be configured to receive uplink data signaling from the one or more access terminals via the selected set of resource elements carrying the uplink data channel. The grant message may identify, for example, a first start time for a first subcarrier interlace of the selected set of resource elements carrying the uplink data channel and a second start time for a second subcarrier interlace of the selected set of resource elements carrying the uplink data channel.

As is also discussed in more detail above, uplink control signaling may be received from an access terminal in a given symbol period even if the access terminal is not designated for control signaling in that symbol period. Further, the transmission power of the uplink control channel may be coupled to that of the uplink data channel (e.g., to match or substantially match coverage areas).

Figure 11:
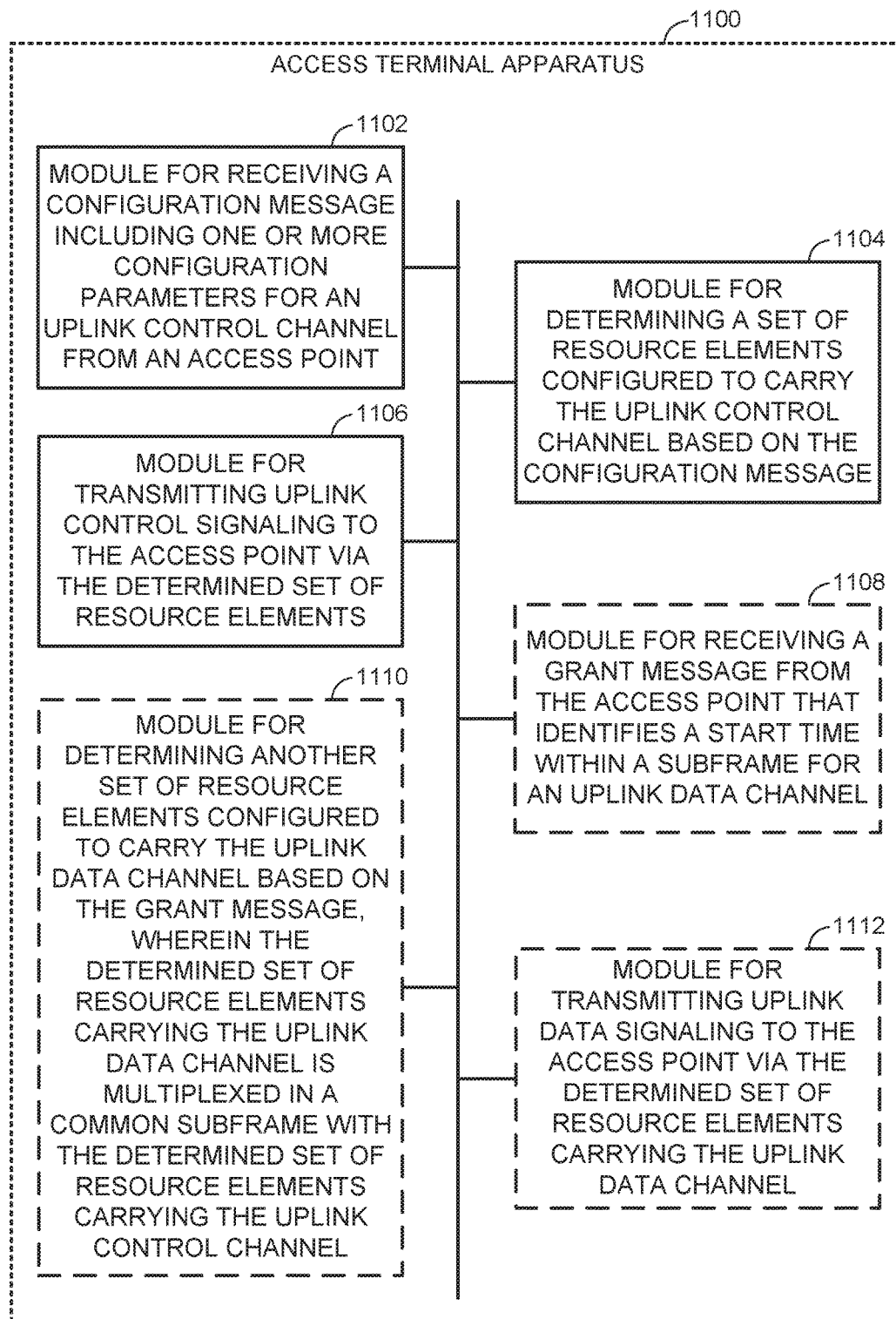
FIG. 11 illustrates an example apparatus represented as a series of interrelated functional modules.

FIG. 11 illustrates an example access terminal apparatus for implementing the uplink channel configuration manager 122 represented as a series of interrelated functional modules. In the illustrated example, the apparatus 1100 includes a module for receiving 1102, a module for determining 1104, a module for transmitting 1106, an (optional) module for receiving 1108, an (optional) module for determining 1110, and an (optional) module for transmitting 1112.

The module for receiving 1102 may be configured to receive a configuration message including one or more configuration parameters for an uplink control channel from an access point. The module for determining 1104 may be configured to determine a set of resource elements configured to carry the uplink control channel based on the configuration message. The module for transmitting 1106 may be configured to transmit uplink control signaling to the access point via the determined set of resource elements.

As discussed in more detail above, the configuration of the uplink control channel may be dynamically changed and the configuration message may be received in different ways. As an example, the one or more configuration parameters may include a subframe identifier identifying one or more uplink subframes in which the determined set of resource elements is located, a symbol period identifier identifying one or more symbol periods in which the determined set of resource elements is located, a subcarrier identifier identifying one or more subcarriers in which the determined set of resource elements is located, or a combination thereof.

Returning to FIG. 11, the (optional) module for receiving 1108 may be configured to receive a grant message from the access point that identifies a start time within a subframe for an uplink data channel. The (optional) module for determining 1110 may be configured to determine another set of resource elements configured to carry the uplink data channel based on the grant message, with the determined set of resource elements carrying the uplink data channel being multiplexed in the subframe with the determined set of resource elements carrying the uplink control channel. The (optional) module for transmitting 1112 may be configured to transmit uplink data signaling to the access point via the determined set of resource elements carrying the uplink data channel. The grant message may identify, for example, a first start time for a first subcarrier interlace of the determined set of resource elements carrying the uplink data channel and a second start time for a second subcarrier interlace of the determined set of resource elements carrying the uplink data channel.

As is also discussed in more detail above, uplink control signaling may be transmitted in a given symbol period even if the access terminal is not designated for control signaling in that symbol period. Further, the transmission power of the uplink control channel may be coupled to that of the uplink data channel (e.g., to match or substantially match coverage areas).

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 10-11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method, comprising:
   selecting a first set of resource elements to carry an uplink control channel;
   transmitting a first configuration message at the beginning of a first radio frame, wherein the first configuration message includes one or more first configuration parameters associated with the first set of resource elements to one or more access terminals;

receiving first uplink control signaling from the one or more access terminals via the first set of resource elements;
selecting a second set of resource elements to carry the uplink control channel, wherein the second set of resource elements:
  includes at least one resource element that was not in the first set of resource elements; or
  excludes at least one resource element that was in the first set of resource elements;
transmitting a second configuration message at the beginning of a second radio frame immediately subsequent to the first radio frame, wherein the second configuration message includes one or more second configuration parameters associated with the second set of resource elements to the one or more access terminals; and
receiving second uplink control signaling from the one or more access terminals via the second set of resource elements.

2. The method of claim 1, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and
the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

3. The method of claim 1, wherein the first configuration message is transmitted to each of the one or more access terminals separately as individual Radio Resource Control (RRC) messages.

4. The method of claim 1, wherein the first configuration message is transmitted to each of the one or more access terminals collectively as a common Downlink Control Information (DCI) message.

5. A method, comprising:
selecting a first set of resource elements within a particular subframe to carry an uplink control channel;
selecting a second set of resource elements within the particular subframe to carry an uplink data channel, wherein the second set of resource elements carrying the uplink data channel is multiplexed in a common subframe with the first set of resource elements carrying the uplink control channel;
transmitting one or more messages to one or more access terminals, wherein the one or more messages comprise:
  one or more first configuration parameters associated with the first set of resource elements;
  one or more second configuration parameters associated with the second set of resource elements;
  a grant message that identifies a start time within the particular subframe for the second set of resource elements carrying the uplink data channel; or
  any combination thereof; and
receiving uplink control signaling from the one or more access terminals via the first set of resource elements and uplink data signaling from the one or more access terminals via the second set of resource elements.

6. The method of claim 5, wherein the grant message identifies a first start time within the particular subframe for a first subcarrier interlace of the second set of resource elements and a second start time within the particular subframe for a second subcarrier interlace of the second set of resource elements.

7. The method of claim 5, further comprising:
allocating at least a portion of the first set of resource elements carrying the uplink control channel to a first access terminal in a first symbol period;
allocating at least a portion of the second set of resource elements carrying the uplink data channel to a second access terminal in a second symbol period; and
receiving signaling from the second access terminal via the allocated portion of the first set of resource elements carrying the uplink control channel during the first symbol period.

8. The method of claim 7, wherein the received signaling comprises a dummy signal having a signature associated with the second access terminal or received over a subcarrier interlace reserved for dummy signaling.

9. The method of claim 5, further comprising:
setting a first transmission power for the uplink data channel;
setting a second transmission power for the uplink control channel based on the first transmission power for the uplink data channel; and
transmitting a power control command to the one or more access terminals that indicates at least the second transmission power for the uplink control channel.

10. An apparatus, comprising:
at least one processor;
at least one memory coupled to the at least one processor, the at least one processor and the at least one memory being configured to select a first set of resource elements to carry an uplink control channel; and
at least one transceiver configured to transmit a first configuration message at the beginning of a first radio frame, wherein the first configuration message includes one or more first configuration parameters associated with the first set of resource elements to one or more access terminals, and to receive first uplink control signaling from the one or more access terminals via the first set of resource elements; wherein
the at least one processor and the at least one memory are further configured to select a second set of resource elements to carry the uplink control channel, wherein the second set of resource elements:
  includes at least one resource element that was not in the first set of resource elements; or
  excludes at least one resource element that was in the first set of resource elements; and
the at least one transceiver is further configured to transmit a second configuration message at the beginning of a second radio frame immediately subsequent to the first radio frame, wherein the second configuration message includes one or more second configuration parameters associated with the second set of resource elements to the one or more access terminals, and receive second uplink control signaling from the one or more access terminals via the second set of resource elements.

11. The apparatus of claim 10, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

12. The apparatus of claim 10, wherein the at least one transceiver is further configured to transmit the first configuration message to each of the one or more access terminals separately as individual Radio Resource Control (RRC) messages.

13. The apparatus of claim 10, wherein the at least one transceiver is further configured to transmit the first configuration message to each of the one or more access terminals collectively as a common Downlink Control Information (DCI) message.

14. An apparatus, comprising:
at least one processor;
at least one memory coupled to the at least one processor, the at least one processor and the at least one memory being configured to:
select a first set of resource elements within a particular subframe to carry an uplink control channel; and
select a second set of resource elements within a particular subframe to carry an uplink data channel, wherein the second set of resource elements carrying the uplink data channel is multiplexed in a common subframe with the first set of resource elements carrying the uplink control channel; and
at least one transceiver configured to transmit one or more messages to one or more access terminals, wherein the one or more messages comprises:
one or more first configuration parameters associated with the first set of resource elements;
one or more second configuration parameters associated with the second set of resource elements;
a grant message that identifies a start time within the particular subframe for the second set of resource elements carrying the uplink data channel; or
any combination thereof;
wherein the at least on transceiver is further configured to receive uplink control signaling from the one or more access terminals via the first set of resource elements and uplink data signaling from the one or more access terminals via the second set of resource elements.

15. The apparatus of claim 14, wherein the grant message identifies a first start time within the particular subframe for a first subcarrier interlace of the second set of resource elements and a second start time second for a second subcarrier interlace of the second set of resource elements.

16. The apparatus of claim 14, wherein:
the at least one processor and the at least one memory are further configured to allocate at least a portion of the first set of resource elements carrying the uplink control channel to a first access terminal in a first symbol period, and to allocate at least a portion of the second set of resource elements carrying the uplink data channel to a second access terminal in a second symbol period; and the at least one transceiver is further configured to receive signaling from the second access terminal via the allocated portion of the first set of resource elements carrying the uplink control channel during the first symbol period.

17. The apparatus of claim 16, wherein the received signaling comprises a dummy signal having a signature associated with the second access terminal or received over a subcarrier interlace reserved for dummy signaling.

18. The apparatus of claim 14, wherein:
the at least one processor and the at least one memory are further configured to set a first transmission power for the uplink data channel, and to set a second transmission power for the uplink control channel based on the first transmission power for the uplink data channel; and the at least one transceiver is further configured to transmit a power control command to the one or more access terminals that indicates at least the second transmission power for the uplink control channel.

19. An apparatus, comprising:
means for selecting a first set of resource elements to carry an uplink control channel;
means for transmitting a first configuration message at the beginning of a first radio frame, wherein the first configuration message includes one or more first configuration parameters associated with the first set of resource elements to one or more access terminals;
means for receiving first uplink control signaling from the one or more access terminals via the first set of resource elements;
means for selecting a second set of resource elements to carry the uplink control channel, wherein the second set of resource elements:
includes at least one resource element that was not in the first set of resource elements; or
excludes at least one resource element that was in the first set of resource elements;
means for transmitting a second configuration message at the beginning of a second radio frame immediately subsequent to the first radio frame, wherein the second configuration message includes one or more second configuration parameters associated with the second set of resource elements to the one or more access terminals; and
means for receiving second uplink control signaling from the one or more access terminals via the second set of resource elements.

20. The apparatus of claim 19, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

21. The apparatus of claim 19, further comprising:
means for selecting a first set of resource elements within a particular subframe to carry an uplink control channel;
means for selecting a second set of resource elements within the particular subframe to carry an uplink data channel, wherein the second set of resource elements carrying the uplink data channel is multiplexed in a common subframe with the first set of resource elements carrying the uplink control channel;
means for transmitting one or more messages to one or more access terminals, wherein the one or more messages comprise:
one or more first configuration parameters associated with the first set of resource elements;
one or more second configuration parameters associated with the second set of resource elements;
a grant message that identifies a start time within the particular subframe for the second set of resource elements carrying the uplink data channel; or
any combination thereof; and
means for receiving uplink control signaling from the one or more access terminals via the first set of resource elements and uplink data signaling from the one or more access terminals via the second set of resource elements.

22. The apparatus of claim 21, further comprising:
means for allocating at least a portion of the first set of resource elements carrying the uplink control channel to a first access terminal in a first symbol period;
means for allocating at least a portion of the second set of resource elements carrying the uplink data channel to a second access terminal in a second symbol period; and
means for receiving signaling from the second access terminal via the allocated portion of the first set of resource elements carrying the uplink control channel during the first symbol period.

23. The apparatus of claim 21, further comprising:
means for setting a first transmission power for the uplink data channel;
means for setting a second transmission power for the uplink control channel based on the first transmission power for the uplink data channel; and
means for transmitting a power control command to the one or more access terminals that indicates at least the second transmission power for the uplink control channel.

24. A non-transitory computer-readable medium comprising code, which, when executed by at least one processor, causes the at least one processor to perform operations for communication, the non-transitory computer-readable medium comprising:
code for selecting a first set of resource elements to carry an uplink control channel;
code for transmitting a first configuration message at the beginning of a first radio frame, wherein the first configuration message includes one or more first configuration parameters associated with the first set of resource elements to one or more access terminals; and
code for receiving uplink control signaling from the one or more access terminals via the first set of resource elements;
code for selecting a second set of resource elements to carry the uplink control channel, wherein the second set of resource elements:
includes at least one resource element that was not in the first set of resource elements; or
excludes at least one resource element that was in the first set of resource elements;
code for transmitting a second configuration message at the beginning of a second radio frame immediately subsequent to the first radio frame, wherein the second configuration message includes one or more second configuration parameters associated with the second set of resource elements to the one or more access terminals; and
code for receiving second uplink control signaling from the one or more access terminals via the second set of resource elements.

25. The non-transitory computer-readable medium of claim 24, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and
the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

26. The non-transitory computer-readable medium of claim 24, further comprising:
code for selecting a first set of resource elements within a particular subframe to carry an uplink control channel;
code for selecting a second set of resource elements within the particular subframe to carry an uplink data channel, wherein the second set of resource elements carrying the uplink data channel is multiplexed in a common subframe with the first set of resource elements carrying the uplink control channel;
code for transmitting one or more messages to one or more access terminals, wherein the one or more messages comprise:
one or more first configuration parameters associated with the first set of resource elements;
one or more second configuration parameters associated with the second set of resource elements;
a grant message that identifies a start time within the particular subframe for the second set of resource elements carrying the uplink data channel; or
any combination thereof; and
code for receiving uplink control signaling from the one or more access terminals via the first set of resource elements and uplink data signaling from the one or more access terminals via the second set of resource elements.

27. The non-transitory computer-readable medium of claim 26, further comprising:
code for allocating at least a portion of the first set of resource elements carrying the uplink control channel to a first access terminal in a first symbol period;
code for allocating at least a portion of the second set of resource elements carrying the uplink data channel to a second access terminal in a second symbol period; and code for receiving signaling from the second access terminal via the allocated portion of the first set of resource elements carrying the uplink control channel during the first symbol period.

28. The non-transitory computer-readable medium of claim 26, further comprising:
code for setting a first transmission power for the uplink data channel;
code for setting a second transmission power for the uplink control channel based on the first transmission power for the uplink data channel; and
code for transmitting a power control command to the one or more access terminals that indicates at least the second transmission power for the uplink control channel.

29. A method, comprising:
receiving a first configuration message at the beginning of a first radio frame, wherein the first configuration message includes one or more first configuration parameters for an uplink control channel from an access point;
determining a first set of resource elements configured to carry the uplink control channel based on the first configuration message;
transmitting first uplink control signaling to the access point via the first set of resource elements;
receiving a second configuration message at the beginning of a second radio frame immediately subsequent to the first radio frame, wherein the second configuration message includes one or more second configuration parameters for the uplink control channel from an access point;
determining a second set of resource elements configured to carry the uplink control channel based on the second configuration message, wherein the second set of resource elements:
includes at least one resource element that was not in the first set of resource elements; or
excludes at least one resource element that was in the first set of resource elements;
transmitting second uplink control signaling to the access point via the second set of resource elements.

30. The method of claim 29, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and
the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

31. The method of claim 29, wherein the first configuration message is received from the access point as an individual Radio Resource Control (RRC) message.

32. The method of claim 29, wherein the first configuration message is received from the access point as a common Downlink Control Information (DCI) message.

33. A method, comprising:
receiving one or more messages from an access point, wherein the one or more messages comprise:
one or more first configuration parameters associated with a first set of resource elements within a particular subframe to carry an uplink control channel;
one or more second configuration parameters associated with a second set of resource elements within the particular subframe to carry an uplink data channel, wherein the second set of resource element carrying the uplink data channel is multiplexed in a common subframe with the first set of resource elements carrying the uplink control channel;
a grant message that identifies a start time within the particular subframe for an uplink data channel; or
any combination thereof;
determining the first set of resource elements based on the one or more messages;
determining the second set of resource elements based on the one or more messages; and
transmitting uplink control signaling to the access point via the first set of resource elements carrying the uplink control channel and uplink data signaling to the access point via the second set of resource elements carrying the uplink data channel.

34. The method of claim 33, wherein the grant message identifies a first start time within the particular subframe for a first subcarrier interlace of the second set of resource elements carrying the uplink data channel and a second start time within the particular subframe for a second subcarrier interlace of the second set of resource elements.

35. The method of claim 33, further comprising:
receiving no allocation from the access point of any of the first set of resource elements carrying the uplink control channel in a first symbol period;
receiving an allocation from the access point of at least a portion of the second set of resource elements carrying the uplink data channel in a second symbol period; and
transmitting signaling to the access point via the allocated portion of the first set of resource elements carrying the uplink control channel during the first symbol period.

36. The method of claim 35, wherein the transmitted signaling comprises a dummy signal having a signature associated with an access terminal transmitting the signaling or transmitted over a subcarrier interlace reserved for dummy signaling.

37. The method of claim 33, further comprising:
receiving a power control command from the access point;
transmitting uplink data signaling via the uplink data channel at a first transmission power based on the power control command; and
transmitting uplink control signaling via the uplink control channel at a second transmission power based on the power control command and the first transmission power.

38. An apparatus, comprising:
at least one transceiver configured to receive a first configuration message at the beginning of a first radio frame, wherein the first configuration message includes one or more first configuration parameters for an uplink control channel from an access point;
at least one processor; and
at least one memory coupled to the at least one processor, the at least one processor and the at least one memory being configured to determine a first set of resource elements configured to carry the uplink control channel based on the first configuration message,
wherein the at least one transceiver is further configured to transmit uplink control signaling to the access point via the first set of resource elements and receive a second configuration message at the beginning of a second radio frame immediately subsequent to the first radio frame, wherein the second configuration message includes one or more second configuration parameters for the uplink control channel from an access point; and wherein the at least one processor and the at least one memory are further configured to determine the second set of resource elements configured to carry the uplink control channel based on the second configuration message, wherein the second set of resource elements:
includes at least one resource element that was not in the first set of resource elements; or
excludes at least one resource element that was in the first set of resource elements; and wherein the at least one transceiver is further configured to transmit second uplink control signaling to the access point via the second set of resource elements.

39. The apparatus of claim 38, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and
the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

40. The apparatus of claim 38, wherein the at least one transceiver is further configured to receive the first configuration message from the access point as an individual Radio Resource Control (RRC) message.

41. The apparatus of claim 38, wherein the at least one transceiver is further configured to receive the first configuration message from the access point as a common Downlink Control Information (DCI) message.

42. An apparatus, comprising:
at least one transceiver configured to receive one or more messages from an access point, wherein the one or more messages comprise:
one or more first configuration parameters associated with a first set of resource elements within a particular subframe to carry an uplink control channel;
one or more second configuration parameters associated with a second set of resource elements within the particular subframe to carry an uplink data channel, wherein the second set of resource element carrying the uplink data channel is multiplexed in a common subframe with the first set of resource elements carrying the uplink control channel;
a grant message that identifies a start time within the particular subframe for an uplink data channel; or
any combination thereof;
at least one processor; and
at least one memory coupled to the at least one processor, the at least one processor and the at least one memory being configured to
at least one processor; and
at least one memory coupled to the at least one processor, the at least one processor and the at least one memory being configured to determine the first set of resource elements based on the one or more messages and determine a the second set of resource elements based on the one or more messages;

wherein the at least one transceiver is further configured to transmit uplink control signaling to the access point via the first set of resource elements carrying the uplink control channel and uplink data signaling to the access point via the second set of resource elements carrying the uplink data channel.

43. The apparatus of claim 42, wherein the grant message identifies a first start time within the particular subframe for a first subcarrier interlace of the second set of resource elements carrying the uplink data channel and a second start time within the particular subframe for a second subcarrier interlace of the second set of resource elements carrying the uplink data channel.

44. The apparatus of claim 42, wherein the at least one transceiver is further configured to receive no allocation from the access point of any of the first set of resource elements carrying the uplink control channel in a first symbol period, to receive an allocation from the access point of at least a portion of the second set of resource elements carrying the uplink data channel in a second symbol period, and to transmit signaling to the access point via the allocated portion of the first set of resource elements carrying the uplink control channel during the first symbol period.

45. The apparatus of claim 44, wherein the transmitted signaling comprises a dummy signal having a signature associated with an access terminal transmitting the signaling or transmitted over a subcarrier interlace reserved for dummy signaling.

46. The apparatus of claim 42, wherein the at least one transceiver is further configured to receive a power control command from the access point, to transmit uplink data signaling via the uplink data channel at a first transmission power based on the power control command, and to transmit uplink control signaling via the uplink control channel at a second transmission power based on the power control command and the first transmission power.

47. A communication apparatus, comprising:
means for receiving a first configuration message at the beginning of a first radio frame, wherein the first configuration message includes one or more first configuration parameters for an uplink control channel from an access point;
means for determining a first set of resource elements configured to carry the uplink control channel based on the first configuration message; and
means for transmitting first uplink control signaling to the access point via the first set of resource elements;
means for receiving a second configuration message at the beginning of a second radio frame immediately subsequent to the first radio frame, wherein the second configuration message includes one or more second configuration parameters for the uplink control channel from an access point;
means for determining a second set of resource elements configured to carry the uplink control channel based on the second configuration message, wherein the second set of resource elements:
includes at least one resource element that was not in the first set of resource elements; or
excludes at least one resource element that was in the first set of resource elements;
means for transmitting second uplink control signaling to the access point via the second set of resource elements.

48. The apparatus of claim 47, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and
the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

49. An apparatus, comprising:
means for receiving one or more messages from an access point, wherein the one or more messages comprise:
one or more first configuration parameters associated with a first set of resource elements within a particular subframe to carry an uplink control channel;
one or more second configuration parameters associated with a second set of resource elements within the particular subframe to carry an uplink data channel, wherein the second set of resource element carrying the uplink data channel is multiplexed in a common subframe with the first set of resource elements carrying the uplink control channel;
a grant message that identifies a start time within the particular subframe for an uplink data channel; or
any combination thereof;
means for determining the first set of resource elements based on the one or more messages;
means for determining the second set of resource elements based on the one or more messages; and
means for transmitting uplink control signaling to the access point via the first set of resource elements carrying the uplink control channel and uplink data signaling to the access point via the second set of resource elements carrying the uplink data channel.

50. The apparatus of claim 49, further comprising:
means for receiving no allocation from the access point of any of the first set of resource elements carrying the uplink control channel in a first symbol period;
means for receiving an allocation from the access point of at least a portion of the second set of resource elements carrying the uplink data channel in a second symbol period; and
means for transmitting signaling to the access point via the allocated portion of the first set of resource elements carrying the uplink control channel during the first symbol period.

51. The apparatus of claim 49, further comprising:
means for receiving a power control command from the access point;
means for transmitting uplink data signaling via the uplink data channel at a first transmission power based on the power control command; and
means for transmitting uplink control signaling via the uplink control channel at a second transmission power based on the power control command and the first transmission power.

52. A non-transitory computer-readable medium comprising code, which, when executed by at least one processor, causes the at least one processor to perform operations for communication, the non-transitory computer-readable medium comprising:
code for receiving a first configuration message at the beginning of a first radio frame, wherein the first configuration message includes one or more first configuration parameters for an uplink control channel from an access point;
code for determining a first set of resource elements configured to carry the uplink control channel based on the first configuration message; and
code for transmitting first uplink control signaling to the access point via the first set of resource elements;
code for receiving a second configuration message at the beginning of a second radio frame immediately subsequent to the first radio frame, wherein the second configuration message includes one or more second configuration parameters for the uplink control channel from an access point;
code for determining a second set of resource elements configured to carry the uplink control channel based on the second configuration message, wherein the second set of resource elements:
includes at least one resource element that was not in the first set of resource elements; or
excludes at least one resource element that was in the first set of resource elements;
code for transmitting second uplink control signaling to the access point via the second set of resource elements.

53. The non-transitory computer-readable medium of claim 52, wherein:
the one or more first configuration parameters include a first subframe identifier identifying one or more uplink subframes in which the first set of resource elements is located, a first symbol period identifier identifying one or more symbol periods in which the first set of resource elements is located, a first subcarrier identifier identifying one or more subcarriers in which the first set of resource elements is located, or a combination thereof; and
the one or more second configuration parameters include a second subframe identifier identifying one or more uplink subframes in which the second set of resource elements is located, a second symbol period identifier identifying one or more symbol periods in which the second set of resource elements is located, a second subcarrier identifier identifying one or more subcarriers in which the second set of resource elements is located, or a combination thereof.

54. The non-transitory computer-readable medium of claim 52, further comprising:
code for receiving one or more messages from an access point, wherein the one or more messages comprise:
one or more first configuration parameters associated with a first set of resource elements within a particular subframe to carry an uplink control channel;
one or more second configuration parameters associated with a second set of resource elements within the particular subframe to carry an uplink data channel, wherein the second set of resource element carrying the uplink data channel is multiplexed in a common subframe with the first set of resource elements carrying the uplink control channel;

a grant message that identifies a start time within the particular subframe for an uplink data channel; or any combination thereof;

code for determining the first set of resource elements based on the one or more messages;

code for determining the second set of resource elements based on the one or more messages; and code for transmitting uplink control signaling to the access point via the first set of resource elements carrying the uplink control channel and uplink data signaling to the access point via the second set of resource elements carrying the uplink data channel.

55. The non-transitory computer-readable medium of claim 54, further comprising:

code for receiving no allocation from the access point of any of the first set of resource elements carrying the uplink control channel in a first symbol period;

code for receiving an allocation from the access point of at least a portion of the second set of resource elements carrying the uplink data channel in a second symbol period; and code for transmitting signaling to the access point via the allocated portion of the first set of resource elements carrying the uplink control channel during the first symbol period.

56. The non-transitory computer-readable medium of claim 54, further comprising:

code for receiving a power control command from the access point;

code for transmitting uplink data signaling via the uplink data channel at a first transmission power based on the power control command; and code for transmitting uplink control signaling via the uplink control channel at a second transmission power based on the power control command and the first transmission power.

* * * * *